United States Patent
Suntken

(10) Patent No.: US 9,829,382 B2
(45) Date of Patent: Nov. 28, 2017

(54) DEVICE FOR OPERATING PASSIVE INFRARED SENSORS

(71) Applicant: Elmos Semiconductor AG, Dortmund (DE)

(72) Inventor: Artur Suntken, Gauteng (ZA)

(73) Assignee: Elmos Semiconductor AG, Dortmund (DE)

( * ) Notice: Subject to any disclaimer, the term of this patent is extended or adjusted under 35 U.S.C. 154(b) by 156 days.

(21) Appl. No.: 14/647,906

(22) PCT Filed: Oct. 21, 2013

(86) PCT No.: PCT/DE2013/000624
§ 371 (c)(1),
(2) Date: May 28, 2015

(87) PCT Pub. No.: WO2015/032373
PCT Pub. Date: Mar. 12, 2015

(65) Prior Publication Data
US 2015/0308900 A1    Oct. 29, 2015

(30) Foreign Application Priority Data
Sep. 5, 2013  (DE) .......................... 10 2013 014 810

(51) Int. Cl.
*G01J 5/10* (2006.01)
*G01J 1/46* (2006.01)
(Continued)

(52) U.S. Cl.
CPC . *G01J 5/10* (2013.01); *G01J 1/46* (2013.01); *G08B 13/191* (2013.01); *H03M 1/12* (2013.01); *H03M 3/424* (2013.01); *H03M 3/458* (2013.01)

(58) Field of Classification Search
CPC ........................................................ G01J 5/10
See application file for complete search history.

(56) References Cited

U.S. PATENT DOCUMENTS 4,377,808 A  *  3/1983  Kao ........................ G08B 13/19
                                        250/DIG. 1
4,825,079 A     4/1989  Takamatsu et al.
(Continued)

FOREIGN PATENT DOCUMENTS

AT            511664 A2    1/2013
EP          1249684 A2   10/2002
(Continued)

OTHER PUBLICATIONS

CP002233019 = "X9313 Digitally-Controlled Potentiometer"; Aug. 11, 1999 (10 pages).

*Primary Examiner* — David Porta
*Assistant Examiner* — Jeremy S Valentiner
(74) *Attorney, Agent, or Firm* — Bejin Bieneman PLC

(57) ABSTRACT

A system for measuring a sensor having two terminals includes first and second transistors with first and second control signal inputs connected to the sensor terminals. The system further includes a current divider including a reference current input, a current divider control input and first and second current outputs connected to the first and second transistors. First and second load circuits are connected to the first and second transistors at first and second differential output nodes. First and second integrator circuits are connected to the first and second differential output nodes. A comparator is driven by first and second differential output nodes. The comparator output controls a digital filter. A value of the a current divider control signal driving the current divider control input depends at least indirectly from the digital filter output.

11 Claims, 12 Drawing Sheets

(51) Int. Cl.
    *H03M 1/12*         (2006.01)
    *G08B 13/191*     (2006.01)
    *H03M 3/00*         (2006.01)

(56) References Cited

U.S. PATENT DOCUMENTS

| | | |
|---|---|---|
| 5,659,316 A | 8/1997 | Stierli |
| 7,242,332 B1 | 7/2007 | Boemler |
| 2006/0187097 A1 | 8/2006 | Dolazza et al. |
| 2010/0259322 A1 | 10/2010 | Acquaviva et al. |
| 2011/0260629 A1 | 10/2011 | Uedaira et al. |
| 2012/0068686 A1 | 3/2012 | Steiner et al. |
| 2013/0082179 A1* | 4/2013 | Fukui ................ G01J 1/44 250/338.3 |
| 2013/0248689 A1* | 9/2013 | Eldesouki ........... G01J 1/46 250/208.1 |

FOREIGN PATENT DOCUMENTS

| | | |
|---|---|---|
| JP | 2003163546 A | 6/2003 |
| JP | 2012013578 A | 1/2012 |
| WO | 2004090570 A2 | 10/2004 |
| WO | 2007057179 A2 | 5/2007 |
| WO | 2010086348 A2 | 8/2010 |

\* cited by examiner

DEVICE FOR OPERATING PASSIVE INFRARED SENSORS

CROSS-REFERENCE TO RELATED APPLICATION

This application claims the benefit of priority to International Application No. PCT/DE2013/000624, filed Oct. 21, 2013, which in turn claims priority to Patent Application No. DE 10 2013 014 810.3, filed Sep. 5, 2013, which applications are hereby incorporated by reference in their entirety.

BACKGROUND

Various known methods are used in the measurement of infrared radiation. An essential part of the sensor principle is the use of passive infrared detectors (PIR Detectors). This is characterized by its simple and cost-effective production.

These PIR detectors are two-terminal devices, and could be represented in the equivalent circuit diagram by a current source that will deliver a current $I_{PIR}$ dependent on changes in radiation and temperature in parallel with a capacitor $C_{PIR}$. (See FIG. 2.)

Various problems arise when analysing the signals received by the PIR sensor:

First, the PIR detector's operating points drift as they start to self-charge. Secondly, the current source $I_{PIR}$, generally, only delivers a very low current at a relatively high internal resistance. This internal resistance $R_{PIR}$ is shown in FIG. 2. These conditions result in the requirement of a wide dynamic range and in a very high internal resistance for the subsequent amplifier and analog-to-digital converter circuit (measurement circuit). In the examples disclosed herein, the analog-to-digital converter circuit is realized with a $\Delta\Sigma$-converter ($\Delta\Sigma$).

Due to the high internal resistance of an ideally operating measurement circuit, charges once generated cannot, however, be discharged. This could cause the circuit to exit the measurement circuit's operating point, as it would be overdriven.

SUMMARY

An evaluation method and a high-impedance measuring circuit with a wide dynamic range are presented that permit the evaluation of signals received from the PIR detector. An overdriven condition due to the disadvantageous charging of the inputs of the PIR detector's measurement circuit is prevented. Power consumption is thereby lowered.

DESCRIPTION

The measurement system is shown in FIG. 1. The passive infrared detector is connected to a discharging circuit $R_G$ via two terminals. This, in turn, is connected to a $\Delta\Sigma$-converter ($\Delta\Sigma$). The output of the $\Delta\Sigma$-converter is connected via a first bus with a first bus bandwidth to a digital filter (DF), whose output OUT has a typically larger second bus bandwidth than the first bus bandwidth.

It was recognized in developing the methodology for operating a passive infrared detector (PIR) that the charging of the inputs posed a definite hindrance to the proper operation of the system. As will further be discussed below, the invented object's $\Delta\Sigma$-converter ($\Delta\Sigma$) is very sensitive to such operating point drift. This increased sensitivity of the $\Delta\Sigma$-converter ($\Delta\Sigma$), however, allows for a particularly efficient suppression of the quantification error through the comparator in the invented object's $\Delta\Sigma$-converter ($\Delta\Sigma$). As a result, the $\Delta\Sigma$-converter ($\Delta\Sigma$) together with the discharging circuit ($R_G$) forms a unique unit.

An easy solution of the improper charging of the inputs was found in that when the voltage at the detector reaches a limit of its dynamic range, a switch activates the discharging of the input node. In this case, no measurement of the detector's voltage can take place during and shortly after the discharge.

A measurement can, alternatively, be performed by measuring the leakage between the sensor's terminals or between the terminals and its ground reference ($R_{dis\_1}$, $R_{dis\_2}$). A significant disadvantage of such a measurement results from the continuous attenuation of the signals and the intrinsic noise given off by the detector. Neither could one implement, without reasonable effort, a Giga-Ohm resistance with low-cost-CMOS-technology.

It was discovered that the discharging of the second output via the internal resistance of the PIR sensor's current source did not render satisfactory results. It showed that the resistance value of the discharge resistors should be greater than 1 MOhm and/or preferably greater than 10 MOhm and/or preferably greater than 100 MOhm and or preferably greater than 1 GOhm and/or preferably greater than 10 GOhm. The optimal discharge resistance value depends on the actual PIR detector and the application in which it is used, and should therefore, from case to case, be adjusted. By larger charge transfers due to rapid changes in temperature (thermal shock) disproportionately lower discharge resistance values are required, which may nearly eliminate the signal to be detected. It is therefore clear that the discharging circuits' ($R_G$) discharge resistors should be, preferably, the same as and possibly symmetrical to each other, in technical jargon "matched". These discharge resistors may also be in the form of complex circuits that could perform other functions in addition to performing the discharge function.

It was considered to be advantageous, if the discharge resistors could at least partially be realized as a switched-capacitor-circuit. By using such circuits the relatively high value impedances can if necessary, be realized quite easily. It is also exceptionally advantageous when operating such a switched-capacitor-circuit that a non-overlapping two-phase clock be used. Single phase and multi-phase clocks may of course also be used but they are in general more complicated to implement.

The requirement for reliably discharging the PIR detector stands in contrast to the high input resistance coming from the measurement circuit. It was therefore recognized, that it would be useful to make the average equivalent resistance or at least the passive infrared detector's discharging resistors, dependent on whether a reading of the infrared radiation potential via the passive infrared sensors (PIR detector), should take place or not, i.e., that a measurement is or is not in progress. The discharging resistors should be switched to a first high impedance state before the measurement (measurement phase). At the end of the measurement, the discharging resistors should be switched to a second low impedance state (non-measurement phase), with an impedance lower than the first high impedance state.

Alternatively, a measurement of the charging levels (detector voltage) can take place and depending on the charging levels the discharging resistors values readjusted accordingly.

It is possible that other operating conditions will also require switching. One could possibly, for example, discharge the PIR detector in a defined manner by means of a switch. In such a modality, a high impedance switch may be used for the discharge resistors. The measurement phase could therefore, in extreme cases, be characterized by a complete disconnection of the discharge circuits. The resistance values orient themselves to the mean values taken over several cycles from the operating clock of the respective switch-capacitor-network, in the case that the discharge resistors are realized in this manner. It is therefore essential that the PIR detector's discharge resistors have different values depending on the state of the sensor system, whereby at least the measurement phase and non-measurement phase/discharge phase are implemented.

The $\Delta\Sigma$-converter includes a differential amplifier. The differential amplifier's current source is not, as in the case of other differential amplifiers, made up of two branches where symmetrical activation of the differential amplifier's transistors divides current symmetrically. Rather, instead of the more typical common connecting node for the transistors found in the branches of the differential amplifier, a current divider is used that splits the current in response to an external control signal. It can therefore be assumed that the bias current source has a finite internal resistance.

A real voltage source can also be used in such a situation. The current divider is made possible by the implementation of a resistor chain, with one end connected to one of the differential amplifier's transistors and the other end connected to the differential amplifier's other transistor. A multiplexer now connects the bias current source dependent on the external control value to a node of this resistor chain. The current divider thus behaves as a digitally controlled potentiometer, whose tap is set by the external signal. In this way, a different negative current feedback for the various branches of the differential amplifier may be set. The current distribution operates in such a way that the gate-source-voltages of the transistors are set by the voltage drop across the current dividers' resistors so that the sum of the current received through the two branches matches that of the current source. The transistors other terminals are each connected to a load resistor.

It was found to be particularly advantageous to implement load resistors with current sources, as this may increase the differential load resistance the resulting differential amplification. Capacitors, that integrate the output signal, can be inserted parallel to these load resistors. One could consider using Miller capacitors. In such a situation, the capacitors of the $\Delta\Sigma$-converter carry out a summing-function of the $\Delta\Sigma$-converter, and thereby eliminate the quantization error through a downstream comparator.

The following methodology applies to operating a passive infrared detector:

Each of the outputs of the passive infrared detector is connected to the control input of a respective associated input transistor of the differential amplifier as described above. Each contact point of these input transistors is connected to a dedicated current divider output of each controllable current divider.

The said current divider distributes the current from a reference current source ($I_{ref}$) dependent on a control input across the current divider's outputs. The other transistors' terminals are then respectively connected to a load resistor, or preferably to an integrating filter or to a capacitor ($C_1$, $C_2$). The output signals of the integrating filter, load resistors and capacitors may be compared to each other through a minimum of at least one comparator.

This generates an unavoidable quantization error that, as will be explained below, is minimized by a feedback mechanism.

The comparator output signal (CPO) of this comparator is connected to a digitally integrating filter that, in addition to the capacitors, carries out a second integration. The digitally integrating filter may also be referred to as the digital integrator ($Int_b$) herein. The control input of the current divider, that splits the current received from a bias current source, is connected to the output of the digital integrator ($Int_b$). If the current divider is implemented in analog manner, then a digital-to-analog-converter and/or a signal format converter will be required to convert the output signal of the digital integrator ($Int_b$) into a matching format. This is not required in the example described here as the multiplexer can be digitally controlled.

The same may be required when adapting the digitally controlled input of the current divider to the digital output of the digital integrator ($Int_b$).

Additionally or alternatively to a two-phase version of the measurement circuit, a one phase version may be utilized. In this case, the output of the passive infrared detector controls at least a second current source. This second current source provides current into a first node ($S_b$). This first node is linked via an integrating filter to the input of a comparator, which compares the signal level received from the first node ($S_b$) to an internal level. The output of this signal is then in turn connected either directly or indirectly to the digital integrator ($Int_b$) and regulates it. The output of this digital integrator ($Int_b$) in turn regulates the digital-to-analog (DAC) converter. The output of this digital-to-analog-converter now regulates a first current source ($I_1$), which in turn also stores current into the first node ($S_b$).

This version contrasts to the previous version in that here, one of the terminals of the passive infrared detector is connected to ground whereas in the previously described version, both of the terminals are connected to the measurement circuit.

Such a circuit is also suitable for the measurement of thermopiles.

It would be advantageous for both methods, if the digital integrator is implemented as an up/down counter, which counts, during the measurement phase, with either a pre-set or programmable clock. The direction of counting may be determined, for example, by the output of the comparator (CPO).

In addition, the increments and the timing intervals of the counter, in which a measurement takes place, can also be constant and pre-set or programmable. In some applications it was proven feasible to make the number of increments counted dependent on the counter itself, to avoid an overflow or underflow and thus total inoperability. If, for example, it is, detected that the counter value exceeds a critical value, the measurement phase will be exited and the discharging state of the detector element activated. This is especially useful in the single-phase variation, as it is able to measure the absolute level of the input signal. The output of the digital integrator ($Int_b$) renders the measurement value.

It would anyway, however, still be advantageous to implement an additional digitally integrating filter (DF) following this digital integrator ($Int_b$), before using the measured value. This will suppress the quantization error after a cut-off frequency is reached. It can be shown that the quantization error becomes zero at a frequency of 0 Hz in the noise spectrum and tends towards a finite value for infinitely high frequencies. The cut-off frequencies thus depend substantially on the load capacitances and the resistance of the current divider and can therefore be well adjusted.

Some of the essential stages of this process may be performed in a signal processor. Only the input stages should be implemented with dedicated electronic circuits. Such a device would then be capable of carrying out this procedure.

DESCRIPTION OF THE DRAWINGS

The measurement circuit is explained with reference to the accompanying diagrams.

A digital filter (DF) filters the counter values obtained from the digital integrator ($Int_b$), realized as an up/down counter, to the output signal (Out), which is the output bus of the digital filter (DF).

Figure 1:
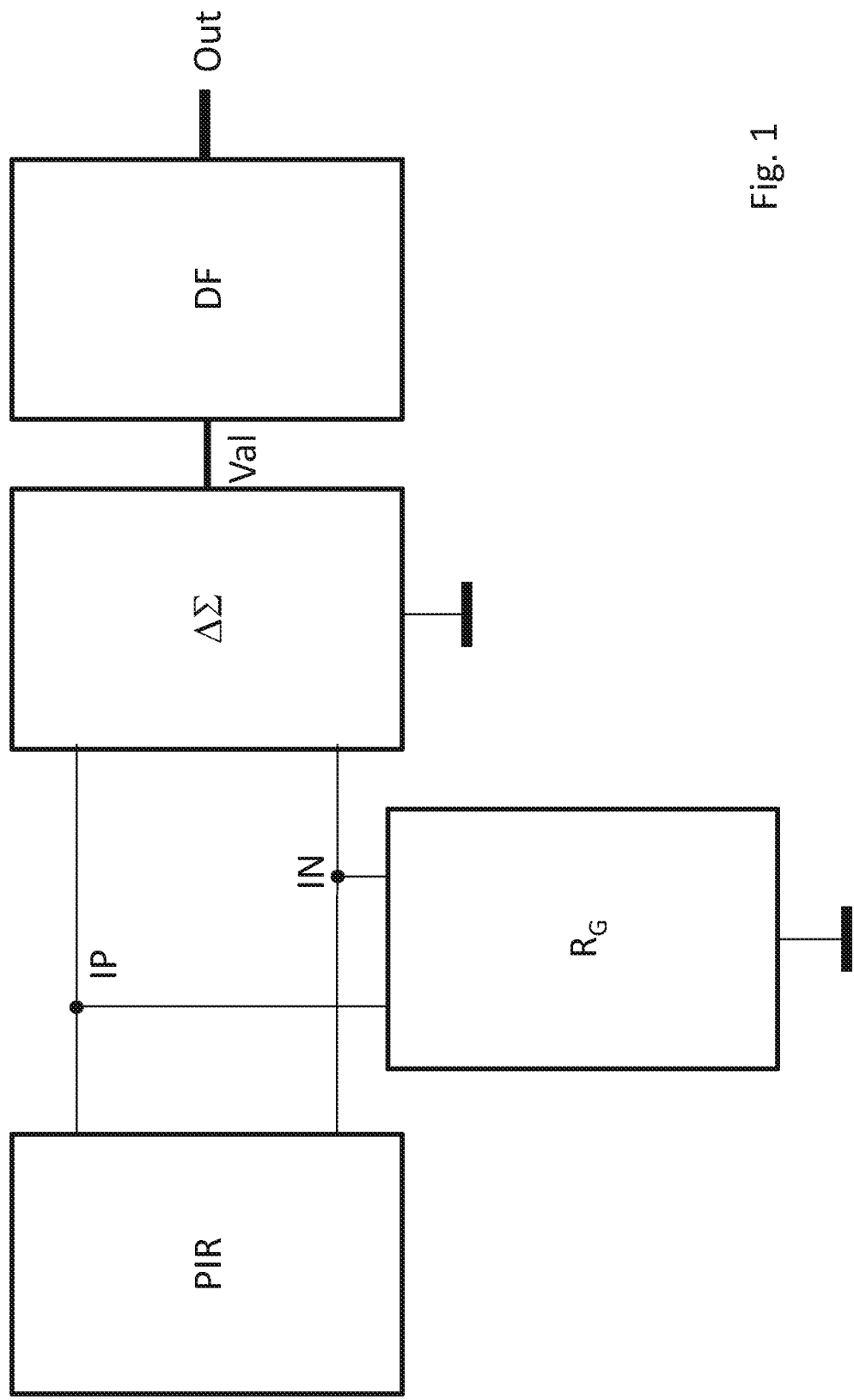
FIG. 1 illustrates the fundamental components of a passive infrared detector in accordance with the principles of the present measurement circuit. The device consists of a passive infrared detector (PIR) that is linked to a discharge circuit $R_G$. The objective of this discharging circuit is to discharge the PIR detectors and to maintain the subsequent $\Delta\Sigma$-converter ($\Delta\Sigma$) at a favorable operating point without impacting the system dynamics The $\Delta\Sigma$-converter ($\Delta\Sigma$) converts the signal received from the discharge circuit into a first digital signal, on the first bus, which has a first bus width (no. of bits). The subsequent digital filter (DF) filters the signal of the first bus and forwards the data, with a higher resolution, via an output bus (Out). Accordingly, the output bus Out typically has a higher bus width than the first bus. For example, the second bus bandwidth may be 14 to 17 bits.
Figure 4:
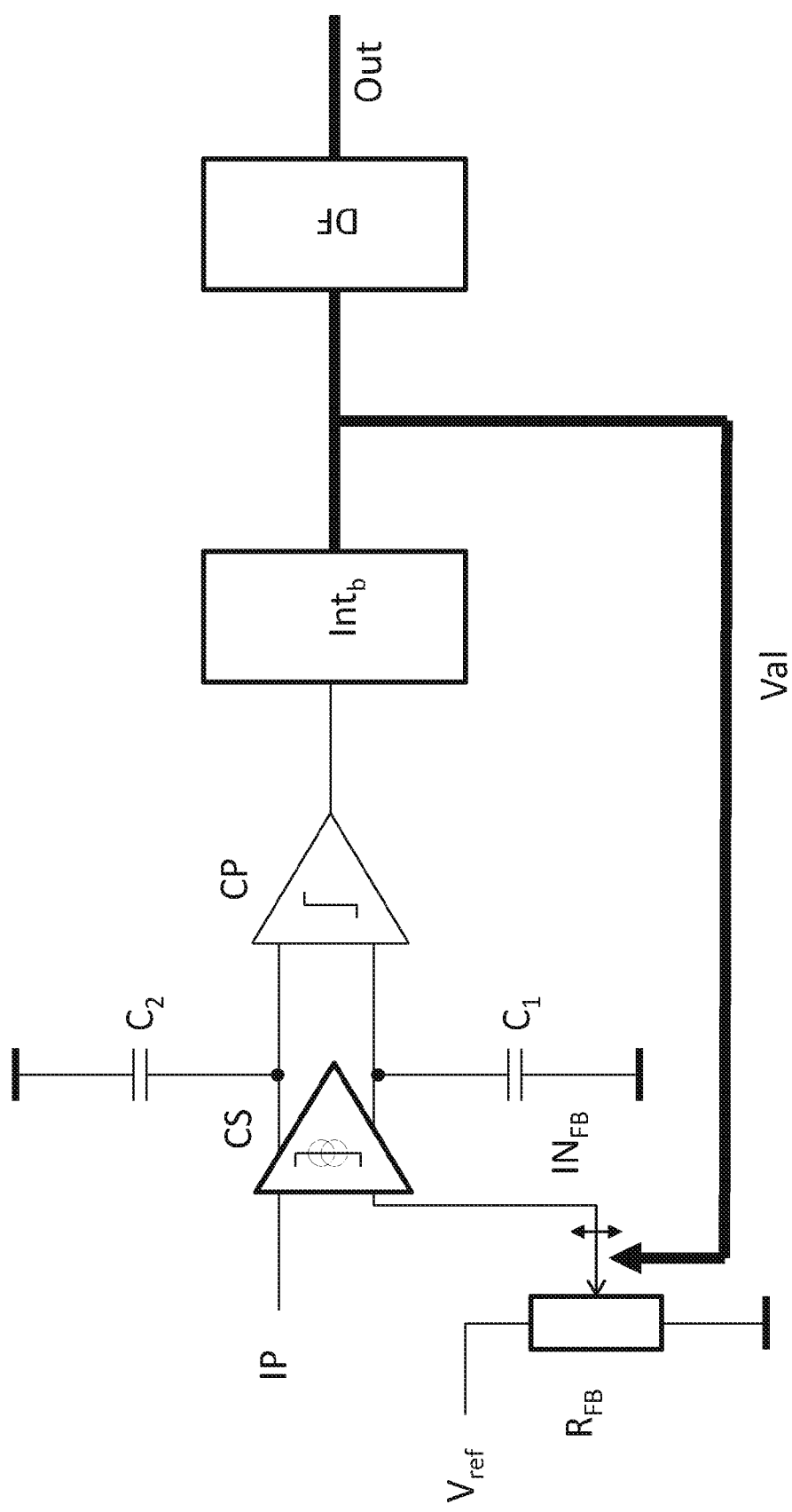

FIG. 4 also illustrates a single-sided version of the $\Delta\Sigma$-converter ($\Delta\Sigma$) of FIG. 1. However, instead of a controlled current source being the source for the reference signal, it is constructed so that the counter value (Val) of the digital integrator ($Int_b$), realized as an up-down counter, selects a tap ($IN_{FB}$), into the resistor cascade ($R_{FB}$) made of individual resistors (not shown). As an example, the counter value (VAL) may be a six bit digital value. This tap can be input to a differential-transconductance-amplifier (CS) that has a current output. The current outputs respectively charge and discharge the capacitors ($C_1$, $C_2$). The resulting voltages at the capacitors ($C_1$, $C_2$) are compared via a comparator to each other, which, in turn, controls the up/down counter.

Figure 5:
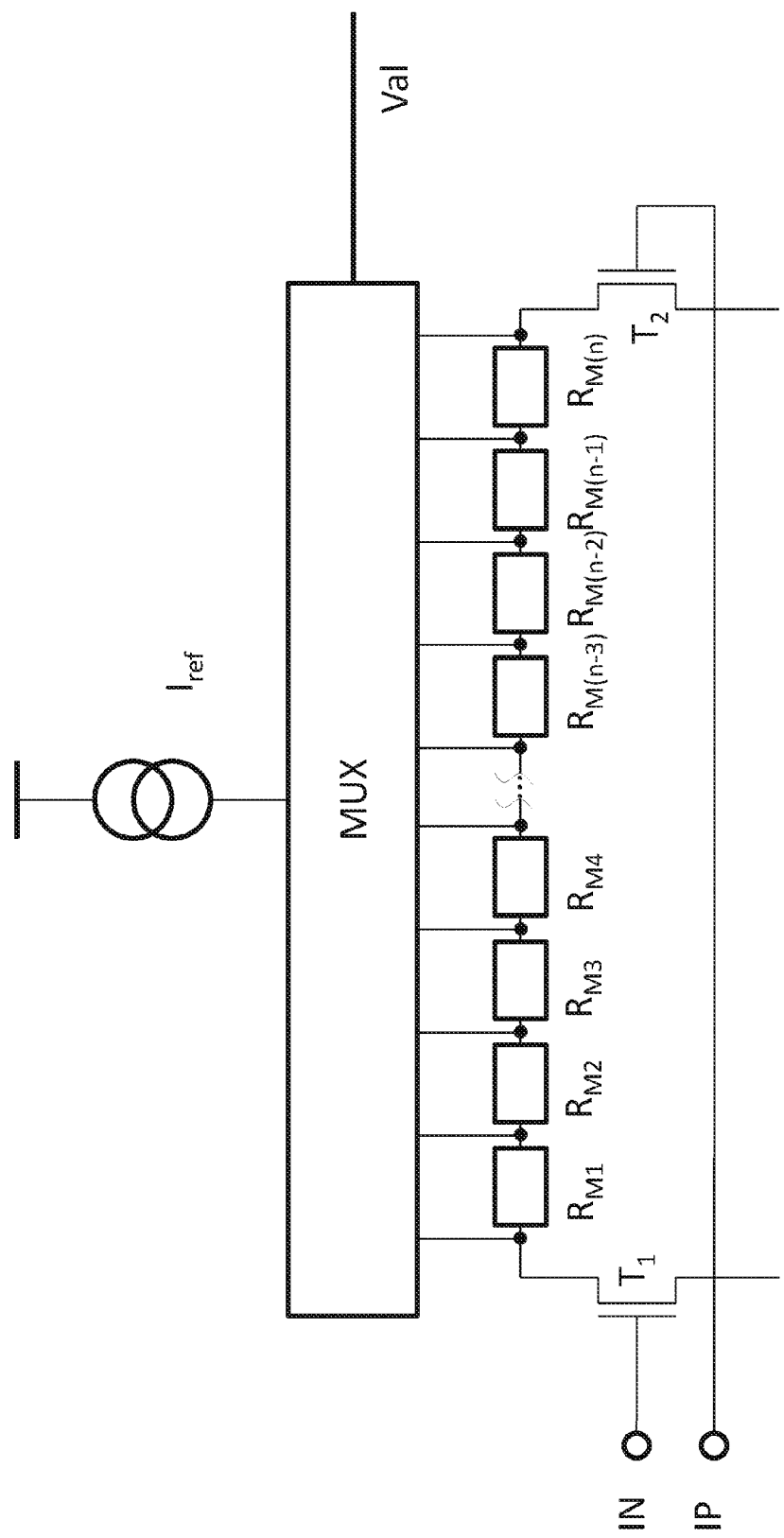

FIG. 5 illustrates a controllable current divider as part of a differential stage consisting of a resistor chain of n resistors $R_{M1}$ to $R_{MB}$, that is typically but not necessarily identically carried out. In this example, the n+1 resistor chain taps are connected via an analog multiplexer (MUX) to a bias current source ($I_{ref}$), The bus width of the counter value (Val) of the analog multiplexer (Mux) selected here must be sufficient and typically higher than the logarithm of n to the basis 2. The current divider, the current source and the transistors ($T_1$, $T_2$) form a differential stage of the measurement circuit.

Figure 6:
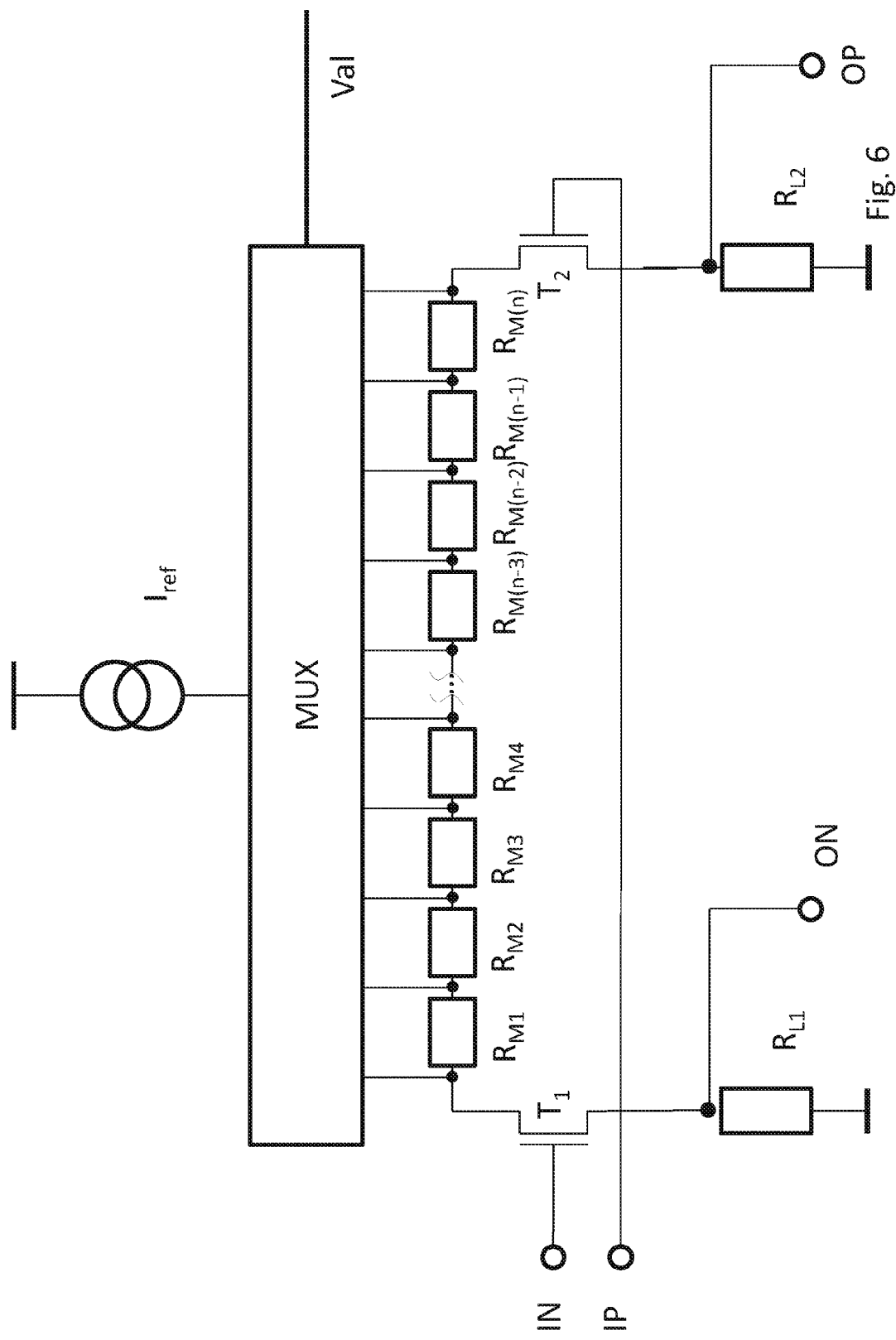

FIG. 6 illustrates the differential stage in FIG. 5 with two operating point resistors ($R_{L1}$, $R_{L2}$). It can be seen that the current divider resistors ($R_{M1}$ to $R_{Mn}$) will result in a different feedback for the two branches of the differential amplifier. This differing current feedback is set by the counter value (Val). In this example two exemplary outputs are depicted.

Figure 2:
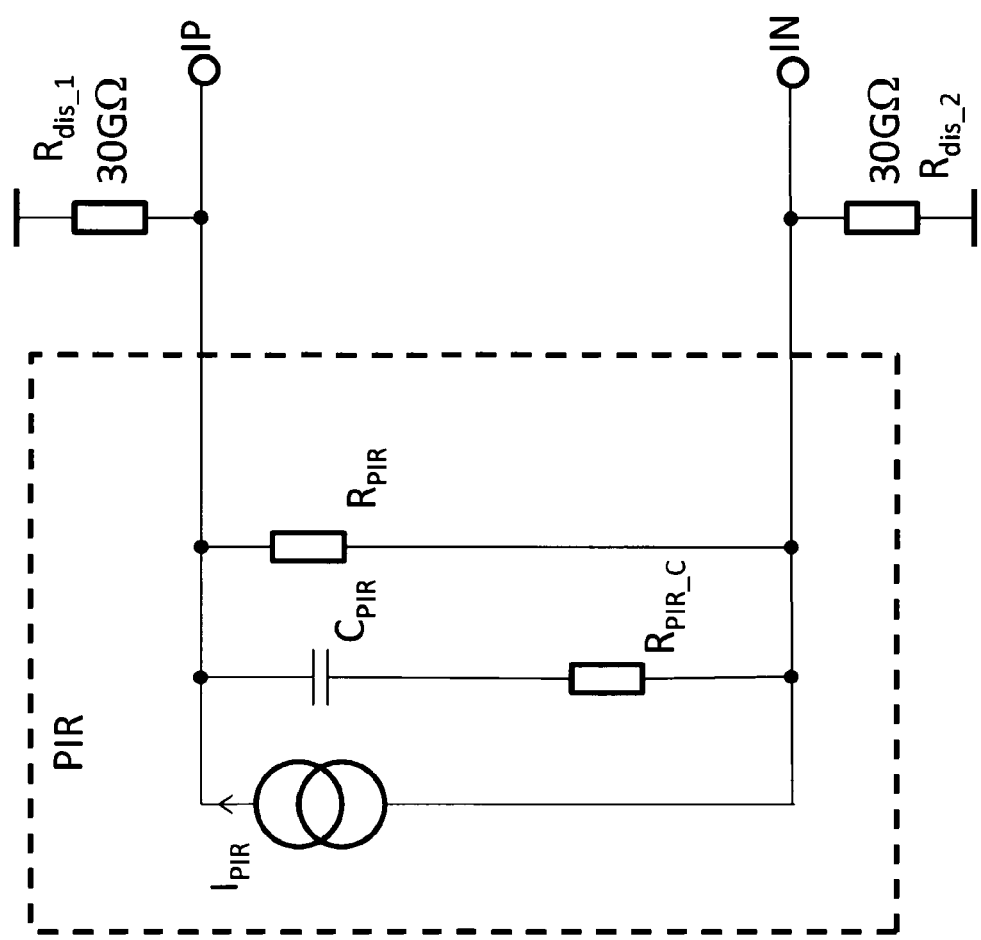
FIG. 2 depicts an equivalent circuit diagram of a passive infrared detector with a current source ($I_{PIR}$) and a series circuit of parasitic detector capacitors ($C_{PIR}$) and associated loss resistors $R_{PIR\_C}$ as well as the internal resistor of the backup current source RPM. The current source's internal resistance ($R_{PIR}$) lies parallel to the current source ($I_{PIR}$), and is typically very high. An excessive load on the detectors will, therefore, cause the output voltage to collapse.
Figure 3:
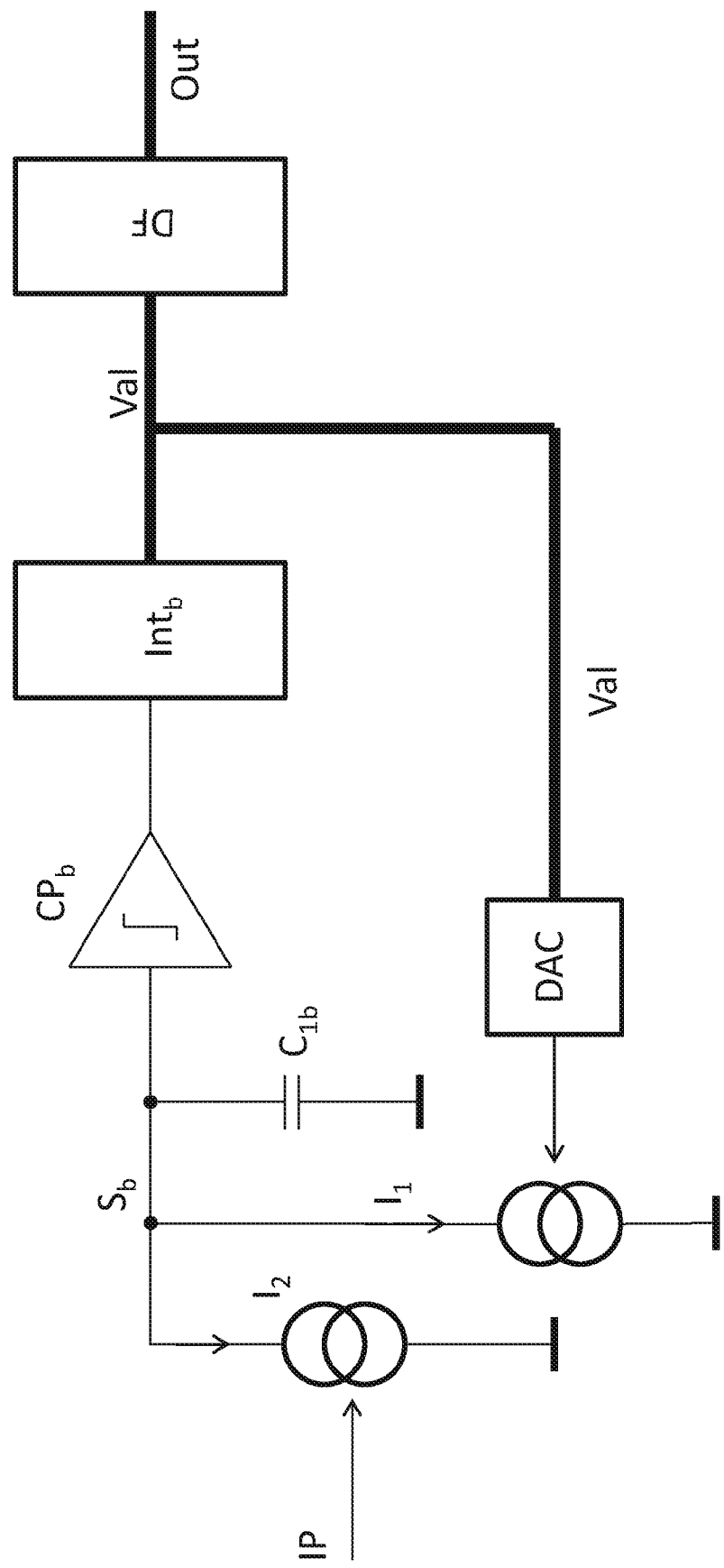
FIG. 3 illustrates a singled sided version of the $\Delta\Sigma$-converter ($\Delta\Sigma$) of FIG. 1. A first controlled current source ($I_1$), (also depicted as an additional current source) is controlled by a feedback path that stores current into the first node (Sb). A second controlled current source ($I_2$), (also depicted as a current source) is controlled by an output of the passive infrared detector and also stores current into the first node ($S_b$). The combined current received from the current sources either charges or discharges the capacitor ($C_{1b}$). If the control loop is stable, the second current source ($I_2$), delivers a current opposite in sign (polarity) and equal in magnitude to the first current source ($I_1$). The comparator is linked via its input to the capacitor ($C_{1b}$) and compares the voltage of this capacitor and thereby the first node ($S_b$) to an internal reference value. As described above (see paragraph 28), the digital integrator ($Int_b$) may be realized as an up/down counter. As in this example, the digital integrator ($Int_b$), realized as an up/down counter, counts with each system clock either upwards or downwards, if the input to the comparator ($CP_b$) is over or under the comparator's ($CP_b$) switching threshold. Six bits of the up/down counter, for example, may be used, to provide feedback. The six bits, as in this example, are converted by a digital-to-analog-converter into an analog signal that controls the other current source ($I_1$).
Figure 7:
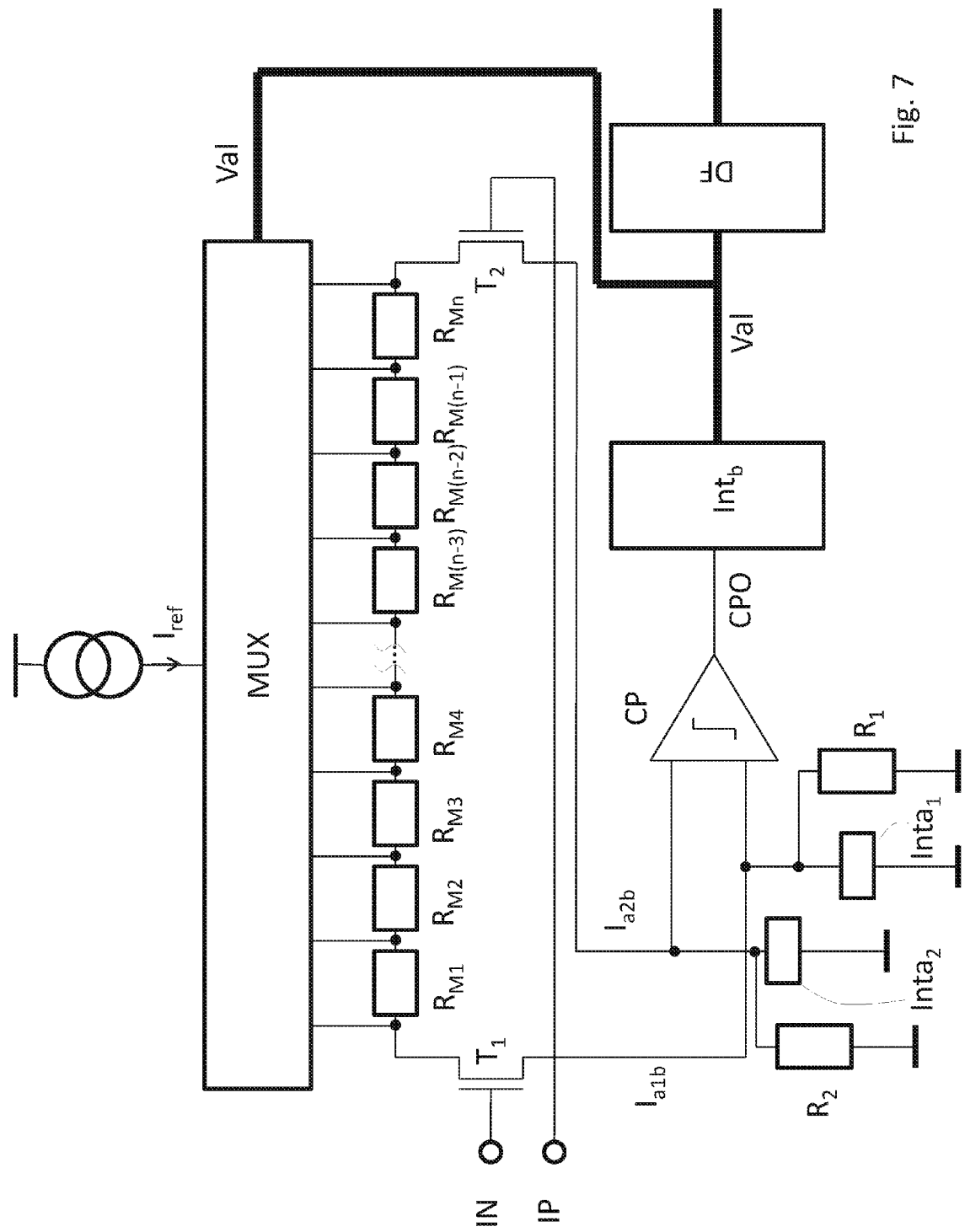

FIG. 7 illustrates the differential stage in FIG. 6 as part of a circuit configuration according to FIG. 3. Instead of the load resistors ($R_{L1}$, $R_{L2}$) in FIG. 6, a respective first and second integrating circuit ($Inta_1$, $Inta_2$) is inserted from nodes $I_{a1b}$ and $I_{a2b}$ to ground, in parallel to the load resistors ($R_1$, $R_2$). As used herein, the term "integrating circuit" can include one or more capacitors (e.g., one of the capacitors C1, C2) and/or one or more integrating filters connected in parallel. The passive infrared detectors are connected to the outputs as in FIGS. 1 and 2. The terminals IN and IP of the passive infrared sensor (PIR) are connected as in FIGS. 1 and 2.

Figure 8:
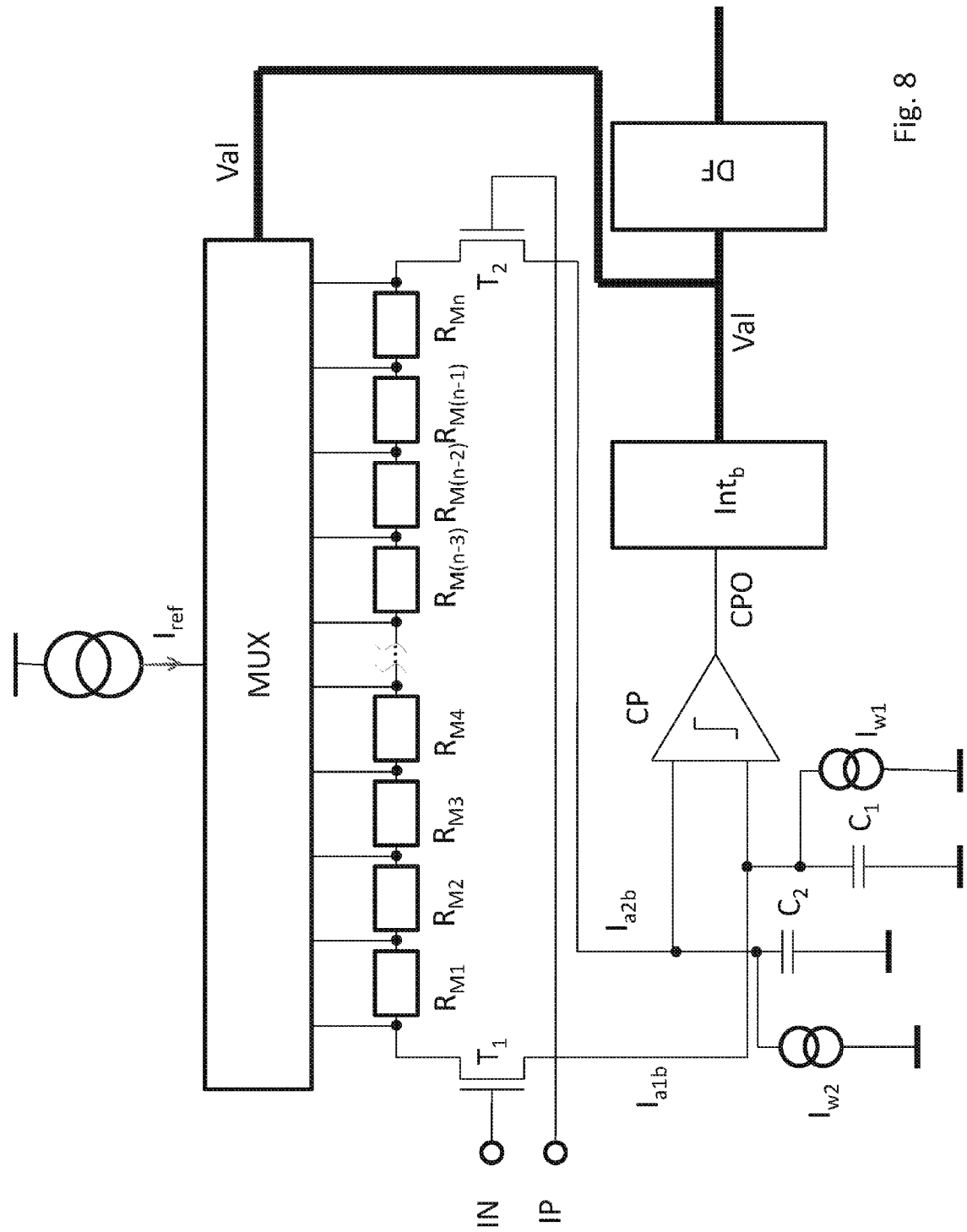

FIG. 8 corresponds to FIG. 7 with the difference that the resistors ($R_1$, $R_2$) are now replaced with real current sources ($I_{W1}$, $I_{W2}$). The advantage of this configuration is that it demonstrates an increase in the differential resistance. In implementing such an integrated semiconductor circuit, this design represents a robust solution against parametric variations.

Advantageously, the design is very simple and therefore requires very little power whereby; it also simultaneously demonstrates a very high input resistance. Further, since the source connections are connected, through negative feedback, via the current divider to their respective gate voltages (in the middle) the gate-source-voltage will not fluctuate. Therefore, the complex input impedances are very high. The gate-source-capacitors do not need to be substantially charged or discharged. The quantization noise of the $\Delta\Sigma$-converter ($\Delta\Sigma$) becomes less with an increase in the number 'n' of resistors $R_{Mi}$.

Figure 9:
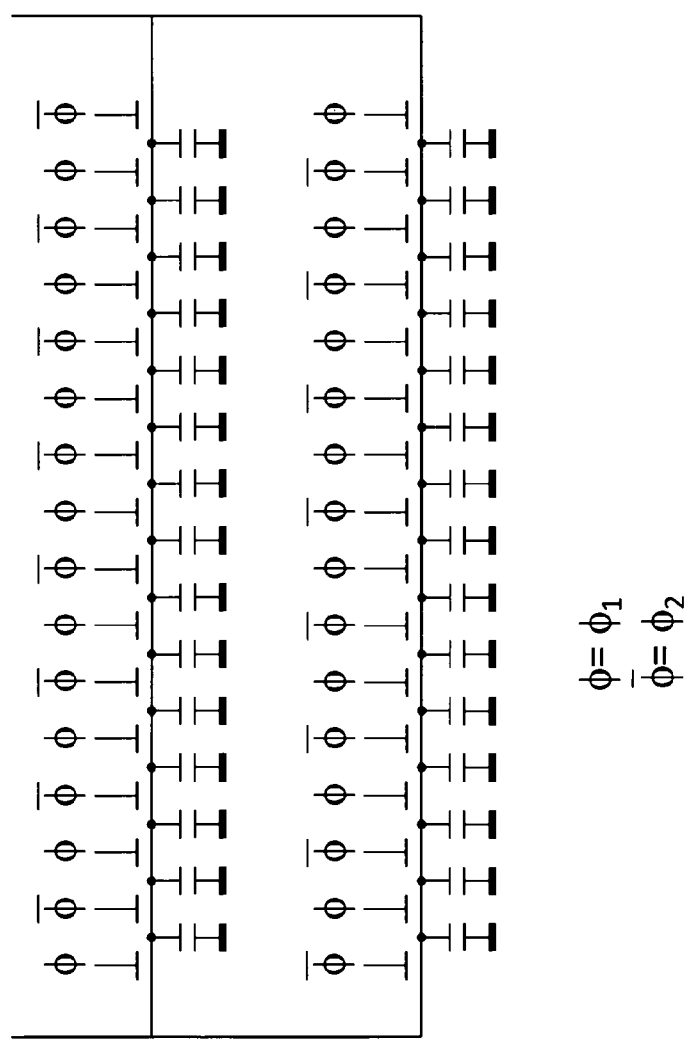

FIG. 9 illustrates a possible implementation of a discharge circuit $R_G$ in FIG. 1 as an alternative to the discharge resistors ($R_{dis\_1}$, $R_{dis\_2}$) in FIG. 1. These resistors must have a relatively high resistance value and should typically have, as nearly as reasonably possible, the same value. The implemented switch-capacitor-implementation, as shown in FIG. 8, works with transfer gates that can alternatively be switched by using one of the two non-overlapping clocks ($\phi_1$, $\phi_2$). Irrespective of the non-overlapping characteristic, one clock operates inversely to that of the other clock. Each of the storage capacitors carries in each phase with it a certain amount of charge and transports the charge at each half cycle a node further. The figure shows two strands. The two strands are respectively offset and driven each half cycle. The strands are respectively operated in delayed half cycle intervals, resulting in continuous charge dissipation. During the measurement phase, the clocks are stopped, and no power will flow. The thus formed load resistance is at high impedance. If the discharging cycle is selected dependent on the input voltage, the discharge can then, for example, be controlled in such a way that it is by high input voltage differences higher and by low input voltage differences lower and that it disappears in a given operating range.

Figure 10:
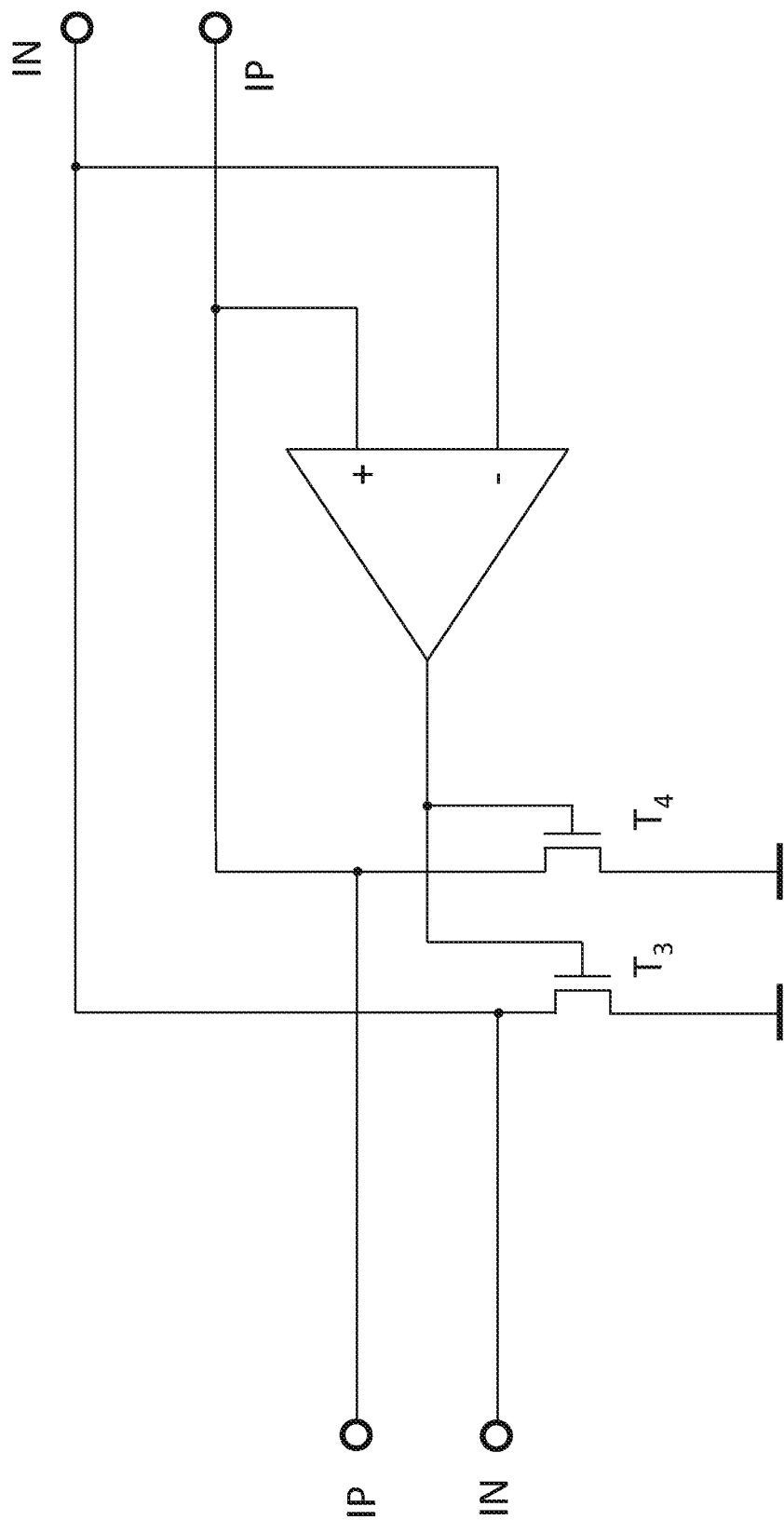

FIG. 10 depicts a further example of a discharge circuit $R_G$ as an active circuit. The transistors T3 and T4 are directly switched dependent on the difference of the voltage input between IP and IN. The differential amplifier forms the difference on its OP and ON inputs and opens the transistors T3 and T4 in accordance with a pre-set function dependent on the differential amount. Due to the non-linear character of the transistors T3, T4, this results, in the case of a vanishing difference between the input voltages IP and IN, in a reduction to zero or nearly zero of the conductance values of the transistors T3 and T4.

Figure 11:
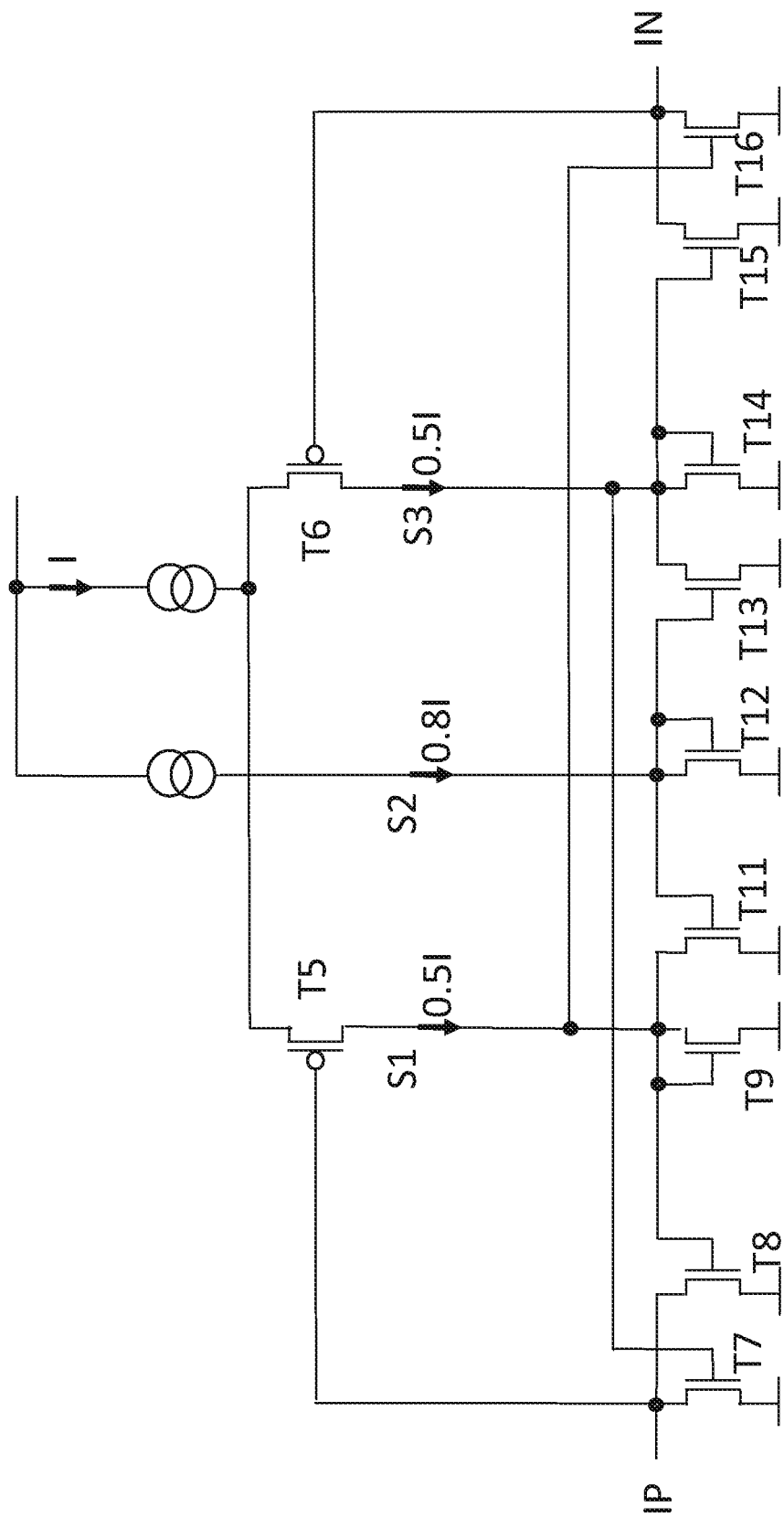

FIG. 11 illustrates a further possible implementation of the discharge circuit $R_G$. A first current source provides half of the current I to the MOS-Diode T9 and the other half of the current I to the MOS-Diode T14. The current in MOS-Diode T14 is reduced by T13. A second current source delivers a current, that typically carries 80% of the value of the current I of the first current source. Since the current of the T11 transistor mirrors the current of the MOS-Diode T12 and the current from the T13 transistor mirrors that of the same MOS-Diode T12, an offset current of typically 80% of current I is directed through T9 and T14. If the bias in the IN and IP inputs is unequal, this will lead to an unbalanced division of current through the differential stage from T5 and T6. This manifests itself, in such a way that additional current can flow through MOS Diodes T9 or T14 that then leads to the transistors T7 and T15 or T8 and T16 opening and thereby to discharging of the input node IP and IN.

Figure 12:
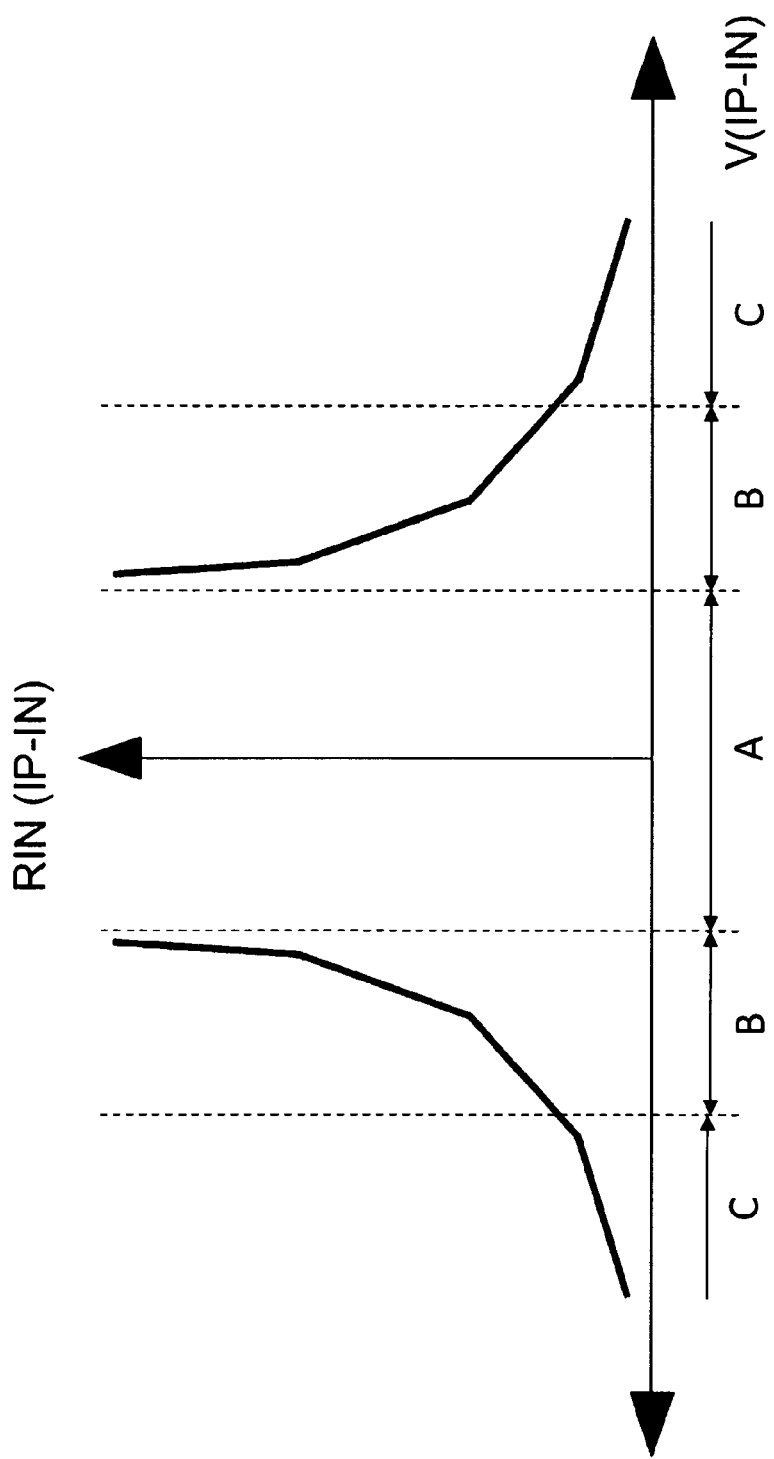

FIG. 12 illustrates an example characteristic curve of the discharge circuit of FIG. 11. It can be achieved, through the suitable selection of the current mirror and the transistor relationship that the input resistor has a high impedance area A, in which the input resistance is practically only determined by the leakage current of the circuit, an area B which has a voltage regulation character, and an area C which demonstrates a very low input impedance. Both terminals are thus discharged through such an electrical circuit arrangement, which presents an equivalent resistance at an operating point in area A which is significantly greater than the equivalent resistance at an operating point in area B or C.

This makes it possible to operate a passive infrared detector in such a way that the electrical terminals are discharged through a current path, when the voltages are outside of a predetermined area A. According to this circuit, the discharge current depends on the difference in input voltage between the electrical terminals IP and IN. In the Area A, which is determined by dimensioning of component values, the discharge current reduces to the leakage current of the transistors. The discharge current increases with increasing the increasing voltage difference when the input voltage is outside of the area A. The input resistance RIN (IP–IN) depends on the differential voltage V (IP–IN) between the inputs IN and IP of the discharge circuit $R_G$. The input resistance depicted here could be, in one case, in a connection between the IP and IN terminals and/or, in a second case, a connection between IP or IN on one side and a reference potential, for example ground, on the other side. The behavior as shown in FIG. 12 should preferably be similar in each of these two cases.

REFERENCE LIST

A high impedance area of the input resistor
ΔΣ ΔΣ-converter
B area which has a voltage regulation character
C area which demonstrates a very low input impedance
$C_1$ Capacitor
$C_{1b}$ Capacitor
$C_2$ Capacitor
$CP_b$ Comparator
CPO comparator output
CS differential-transconductance-amplifier that has a current output
DAC digital-to-analog converter
DF digital filter
$I_1$ first current source
$I_2$ second current source
$I_{a1b}$ node
$I_{a2b}$ node
$I_{W1}$ current source
$I_{W2}$ current source
$I_{PIR}$ current source of the equivalent circuit diagram of a passive infrared detector
$I_{ref}$ bias current source
$Int_{a1}$ integrating filter
$Int_{a2}$ integrating filter
$Int_b$ digital integrator
IN input voltage
IP input voltage
Mux multiplexer
ON differential amplifier input
OP differential amplifier input
OUT output of the digital filter (DF)
PIR passive infrared detector
$\phi_1$ non overplapping clock
$\phi_2$ non overplapping clock
$R_1$ resistor
$R_2$ resistor
$R_{dis\_1}$ discharge resistor
$R_{dis\_2}$ discharge resistor
$R_G$ discharging circuit
$R_{L1}$ operating point resistor
$R_{L2}$ operating point resistor
$R_{M1}$ current divider resistor
$R_{Mi}$ current divider resistor
$R_{Mn}$ current divider resistor
$R_{PIR\_C}$ loss resistor of the equivalent circuit diagram of a passive infrared detector
$R_{PIR}$ internal resistance of the current source of the equivalent circuit diagram of a passive infrared detector
RIN input resistance
$S_b$ first node
V (IP–IN) differential voltage between the inputs IN and IP of the discharge circuit $R_G$
Val counter value

The invention claimed is:
1. A system for measuring a sensor, the sensor including a first sensor terminal and a second sensor terminal, comprising:
a first transistor including a third terminal, a fourth terminal and a fifth terminal, the third terminal being a first transistor control terminal and connected to the first sensor terminal;

a second transistor including a sixth terminal, a seventh terminal and a eighth terminal, the sixth terminal being a second transistor control terminal and connected to the second sensor terminal;

a current divider including a reference current input, a control input, a first current divider output and a second current divider output, wherein the first current divider output is connected to the fourth terminal of the first transistor and the second current divider output is connected to the seventh terminal of the second transistor;

a reference current source connected to the reference current input;

a first load circuit connected to the fifth terminal of the first transistor at a first differential output node;

a second load circuit connected to the eighth terminal of the second transistor at a second differential output node;

a first integrating circuit connected to the first differential output node, and configured to integrate a first differential output signal;

a second integrating circuit connected to the second differential output node, and configured to integrate a second differential output signal;

a comparator including a first comparator input, a second comparator input and a comparator output, wherein the first comparator input is connected to the first differential output node and the second comparator input is connected to the second differential output node; and a digital integrator having a digital integrator input and a digital integrator output, wherein the digital integrator input is driven by the comparator output;

wherein:

a value of a current divider control signal driving the current divider control input depends from the digital integrator output.

2. The system of claim 1, wherein:
the first and second load circuits include respectively first and second load resistors configured to provide a load to the respective first and second differential output nodes.

3. The system of claim 1, wherein:
the first and second load circuits include respectively first and second load current sources configured to provide a load to the respective first and second differential output nodes.

4. The system of claim 1; wherein the current divider further includes:
a resistor string including a plurality of resistors arranged in a series configuration including a plurality of taps, the plurality of taps including the first current divider output on a first end of the resistor string, the second current divider output on a second end of the resistor string, and a plurality of middle taps arranged respectively between pairs of adjacent resistors in the resistor string; and
an analog multiplexer arranged to connect one of the plurality of taps to the reference current input, the one of the plurality of taps selected based on the value of the current divider control signal.

5. The system of claim 1, wherein:
the first and second integrating circuits include respectively first and second integrated filters.

6. The system of claim 1, wherein:
the first and second integrating circuits include respectively first and second integration capacitors.

7. The system of claim 6, wherein the sensor includes a passive infrared detector.

8. The system of claim 1, further comprising:
a digital filter having a digital filter input and a digital filter output, the digital filter input driven by the digital integrator output; wherein:
the value of the current divider control signal depends directly from the digital filter output.

9. The system of claim 1; wherein:
the digital integrator includes an up/down count; and
a value of the comparator output controls a direction of counting of the up/down counter.

10. The system of claim 9, wherein:
a rate of at least one of incrementing and decrementing the up/down counter is predetermined.

11. The system of claim 9, wherein:
a rate of at least one of incrementing and decrementing the up/down counter is programmable.

* * * * *